UNITED STATES PATENT OFFICE.

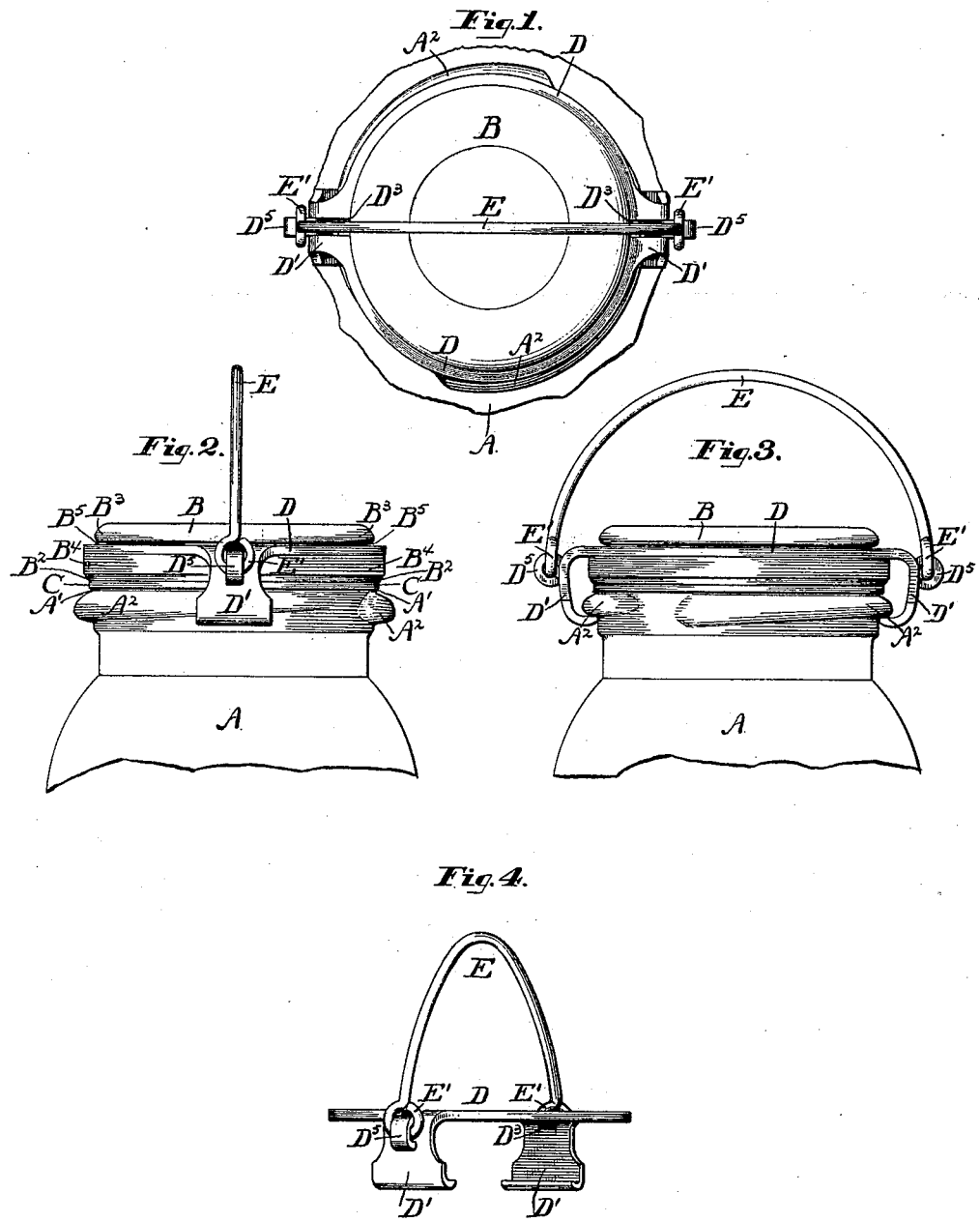

JOSEPH B. WILSON, OF CLAYTON, NEW JERSEY.

AIR-TIGHT JAR.

SPECIFICATION forming part of Letters Patent No. 348,084, dated August 24, 1886.

Application filed January 20, 1886. Serial No. 189,136. (No model.)

*To all whom it may concern:*

Be it known that I, JOSEPH B. WILSON, a citizen of the United States, residing at Clayton, in the county of Gloucester and State of New Jersey, have invented certain new and useful Improvements in Air-Tight Jars; and I do hereby declare the following to be a sufficiently full, clear, and exact description thereof as to enable others skilled in the art to make and use the said invention.

This invention relates to air-tight jars used for the preservation, storage, and transportation of alimentary substances, and has for its object the production at low cost of a convenient and efficient tight-closing vessel, the nature of which invention may be briefly stated to consist of a clamp easily attached to and not easily detached from the cover and provided with a bail for conveniently carrying the jar and its contents, the characteristic peculiarities of this invention being that the clamp embraces the lid of the jar so as not to become easily detached and lost, and being formed with its ears of a single integral piece of flexible metal, and from its construction is stronger and can be manufactured more cheaply than others heretofore made for such uses. The mode of making and applying the said clamp and bail is hereinafter fully described and shown in the accompanying drawings, in which—

Figure 1 is a top view, Fig. 2 a side elevation, Fig. 3 a front elevation, and Fig. 4 is a perspective view, of the clamp and bail as separated from the jar and cover.

The same letters of reference indicate the same parts in the several figures.

A is the jar having a shoulder, A', adapted to receive a gasket, C, of india-rubber or some other similar yielding or elastic material.

$A^2$ are two opposite helical projecting segments formed on the jar below the shoulder A'.

B is the cover having a rim fitting over the jar-mouth and resting with its lower edge, $B^2$, on the gasket C, into which it impinges when closed down.

Upon the edge of the cover B are formed projecting circumferential bands or beads $B^3$ and $B^4$, between which is a circumferential groove, $B^5$. The lower bead, $B^4$, is preferably of greater diameter.

D is a clamp consisting of a ring of ductile metal having hooks D' extending downwardly therefrom, adapted to fit with their lower ends under the helical segments $A^2$ on the jar A. The central opening of the ring D is of such size as to fit in the groove $B^5$, between the beads $B^3$ and $B^4$. Slits $D^3$ are formed in the hooks D', extending downwardly therein from the central opening toward, but not to, the lower ends of the hooks D'. These slits permit the ring D to be sprung over the upper bead, $B^3$, and rest in the groove $B^5$, against the bead $B^4$. In the slits $D^3$ are eyes $D^5$, formed of the same piece of metal as the hooks D' and upon the clamp D, into which a bail, E, having hooks E', is inserted, by which the closed jar may be conveniently carried in the hand.

In closing the jar with the cover and clamp connected in the manner above described it is simply requisite to place cover B on the jar A with its lower edge or rim, B', resting upon the gasket C and the hooks D' between the ends of the helical segments $A^2$, and turn the clamp-ring so that the hooks move on the lower and downwardly-inclined surface of the segments $A^2$, the bail E affording a convenient handle wherewith to turn the clamp D. The intimate contact of the rim B', gasket C, and shoulder A' is enforced by the pressure applied by the clamp effectually sealing the jar. The downward strain of the hooks D' tends to close the slits $D^3$, contracting the opening $D^2$ and holding the ring D more securely in the groove $B^5$.

Jars thus constructed are specially convenient and useful for preserving and transporting milk.

I am aware that screw-caps for jars have been constructed with ears or eyes attached thereto and having bails inserted in such ears or eyes. These require the ears to be made of separate pieces of metal, are expensive to make, are not so substantial as when formed of the same piece of metal as the double-hooped ring-clamp, as shown in this invention, are separable from the covers, and therefore objectionable, and are hereby disclaimed; but, Having described this, my said invention, what I claim is—

A jar-clamp D, made of flexible metal, consisting of a ring adapted to fit in a circumferential groove in a jar-cover and having a pair of slotted hooks, D', adapted to engage in helical projections on the jar-neck, and containing eyes $D^5$, all formed from the same integral piece of metal, and attached to a bail, E, substantially as shown and described, for the purpose set forth.

JOSEPH B. WILSON.

Witnesses:
J. DANIEL EBY,
W. C. ADAMS.